June 4, 1963   J. R. WILLSON   3,092,142
GAS COCK
Filed Sept. 11, 1959

United States Patent Office 3,092,142
Patented June 4, 1963

3,092,142
GAS COCK
James R. Willson, Greensburg, Pa., assignor to Robertshaw-Fulton Controls Company, Richmond, Va., a corporation of Delaware
Filed Sept. 11, 1959, Ser. No. 839,370
3 Claims. (Cl. 137—614.11)

This invention relates to gas cocks for controlling the supply of gaseous fuel to burners.

Gas cocks have been arranged with two ports movable relative to one another through a limited angular position to control the rate of flow of gas. Since this angular displacement is small, it does not allow for a fine adjustment of the flow rate so that many gas cocks have been provided with a rotary disc valve member and other members which cooperate to produce the desired degree of control.

This invention has as one of its objects the control of the flow of fuel in a gas cock linearly in proportion to the angular position of the operating element.

Another object of this invention is to allow the gas cock to be accommodated in a simple manner to various types of gas and to different gas supply pressures.

In accordance with one feature of this invention, a gas cock is provided with a valve body formed with suitable passage means which are cooperable with a rotary disc valve member and a rotatable cam disc for providing respectively on-off control and a variable flow rate. The rotary disc valve member and the cam disc are interconnected by motion transmitting means which includes a friction drive between the valve member and the motion transmitting means and a positive drive between the cam disc and the motion transmitting means such that the cam disc normally rotates in response to rotation of the valve member yet the angular position between the valve member and the cam disc may be changed by overcoming the force of the friction connection.

Other objects and advantages of this invention will be apparent from the following description taken in connection with the accompanying drawing wherein.

Figure 1:
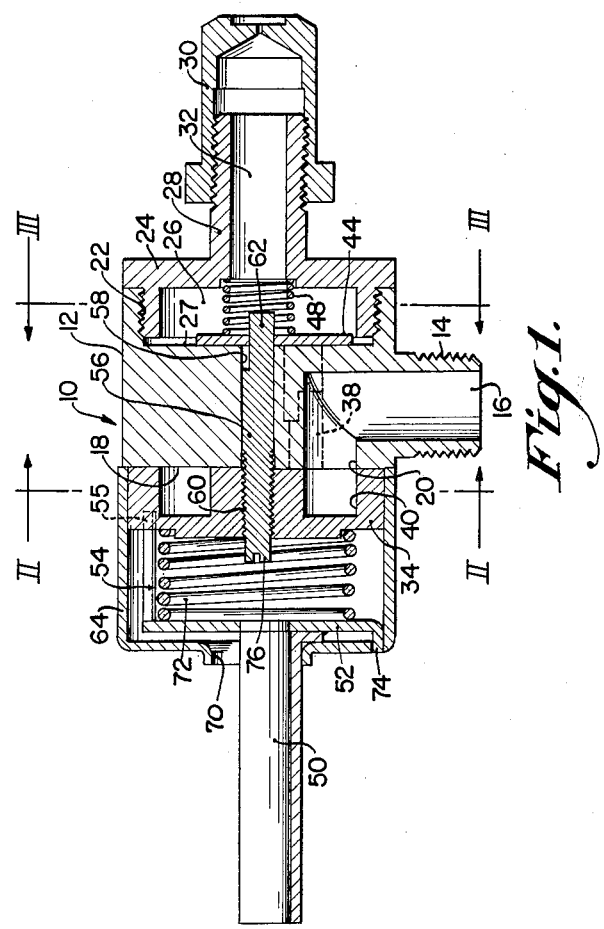
FIG. 1 is a longitudinal sectional view of a preferred embodiment of this invention.

Referring now more particularly to the drawing, the gas cock, indicated generally by reference numeral 10, is of the angle type and provided with a somewhat cubical valve body 12 having an exteriorly threaded inlet 14 adapted to be connected to a source of gas supply, as for example, a conventional supply manifold. Inlet 14 is formed with an angular inlet passage 16 which intersects the front face 18 of body 12 to form a port 20.

The threaded face of body 12 is formed with an interiorly threaded counterbore 22 into which a threaded hollow plug 24 is inserted to define an outlet chamber 26 and a rear face 27 of body 12. Plug 24 is provided with an exteriorly threaded outlet 28 on which a conventional orifice spud 30 is mounted. Orifice spud 30 is preferably in the form of a removable cap containing an orifice which permits adjustment of the flow of gas either by substitution of a new spud having a different sized orifice or by movement of a conventional needle (not shown) with respect to it. Outlet 28 is formed with an outlet passage 32 which communicates with outlet chamber 26 for delivering gas to spud 30.

Valve means are provided for controlling the on-off flow of gas through gas cock 10 and preferably takes the form of a rotary disc valve member 34 which is cooperable with face 18 for controlling the flow of gas from port 20 to a port 36 of a passage means 38 formed in valve body 12. The rear face of valve member 34 is formed with an arcuate groove 40 which partially extends around the axis of member 34 at a radial distance equal to the radial displacement of ports 20 and 36. Both the rear face of valve member 34 and front face 18 are machined flat and lubricated lightly to prevent the leakage of gas therebetween.

Figure 2:
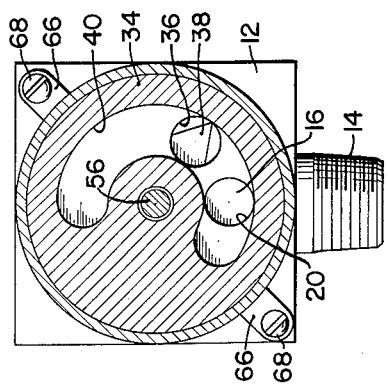
FIG. 2 is a cross section taken along line II—II of FIG. 1.
Figure 3:
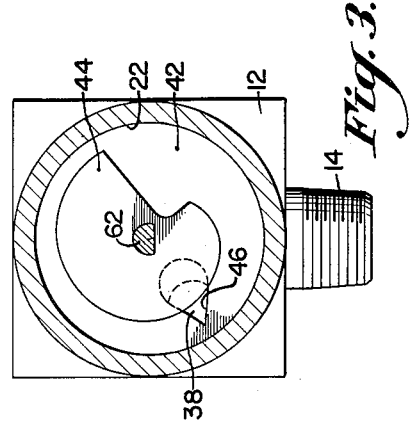
FIG. 3 is a cross section taken along line III—III of FIG. 1.

Ports 20 and 36 are suitably angularly spaced from one another to prevent the seepage of gas therebetween and cooperate with groove 40 to control the flow of gas from inlet passage 16 to passage means 38. When valve member 34 is in an off position, groove 40 is so positioned that the rear face of valve member 34 covers port 36 to prevent the flow of gas. As valve member 34 is rotated clockwise, as viewed in FIG. 2, to an on position, port 36 is uncovered to permit gas to flow from inlet passage 16 to passage means 38.

The rear face 27 of body 12 is machined and cooperates with restricting means in the form of a cam disc 44, suitably machined, to control the rate of flow of gas through gas cock 10. Passage means 38 extends through valve body 12 between front face 18 and rear face 27 and is cylindrical in form over its front half. The rear half of passage means 38 is in the form of a cylindrical hole intersecting a triangular hole having a radially extending apex. Passage means 38 intersects rear face 27 at a port 46. Cam disc 44 is constructed with a shape which provides a linear flow rate proportional to the angular position of cam disc 44. Biasing means are provided for maintaining cam disc 44 in engagement with face 42 and may take the form of a helical compression spring 48 disposed between the inner face of plug 28 and the rear face of cam disc 44.

Actuating means are provided for moving valve member 34 and cam disc 44 between controlling positions and comprise a manually operable shaft 50 formed at its inner end with a flanged portion which is suitably connected to an annular plate 52, as for example, by welding. A pin 54 is connected to plate 52 and extends rearwardly into operative engagement with the wall of an aperture 55 formed in valve member 34 to transmit rotation thereto in response to rotation of shaft 50. This aperture 55 also allows limited longitudinal movement of pin 54 therein for a purpose which will be apparent hereinafter.

Motion transmitting means are provided between valve member 34 and cam disc 44 for rotating cam disc 44 in response to rotation of shaft 50 and comprise a cylindrical rod 56 journalled in an axial bore 58 which extends through valve body 12. Rod 56 and valve member 34 are connected at 60 through a frictional threaded means which normally allows rotation of rod 56 in response to rotation of valve member 34. End 62 of rod 56 is D-shaped in cross section and fits into a suitably formed aperture in cam disc 44 to positively transmit rotation thereto in response to rotation of rod 56.

A cup-shaped cap 64 is provided at one end with a pair of outwardly extending perforated tabs 66, 66 by means of which a pair of screws 68, 68 attach cap 64 to valve body 12. The end wall of cap 64 is formed with an enlarged aperture 70 through which shaft 50 passes. A helical compression spring 72 is disposed within cap 64 and extends between plate 52 and valve member 34 to bias plate 52, pin 54 and shaft 50 outwardly and to bias valve member 34 inwardly against face 18.

Locking means may be provided for preventing rotation of valve member 34 from the off position unless shaft 50 is first depressed and comprises a tab 74 on plate 52 which fits into an aperture suitably formed in the end wall of cap 64 only when the gas cock 10 is in an off position. It will be obvious that shaft 50 must first be depressed against the bias of spring 72 when in an off position before it can be rotated. On the other hand, when shaft 50 is rotated to the off position, tab 74 is automatically moved outwardly into the cooperating aperture in cap 64 by spring 72.

When gas cock 10 is turned on, the flow rate is proportional to the angular position of shaft 50 and cam disc 44. To allow the gas cock 10 to be accommodated to various types of gas and different manifold supply pressures and to be calibrated, the relative angular position between shaft 50 and cam disc 44 may be changed. In making such an adjustment, the front end 76 of rod 56 is slotted and shaft 50 is formed with a C-shaped transverse section so that a screwdriver may be inserted through the central aperture of plate 52 so as to engage shaft 56. The adjustment is made by holding shaft 50 stationary and turning the screwdriver with a force sufficient to overcome the frictional engagement between the threads at 60. This movement causes end 62 to slide axially through and rotate cam disc 44 a desired amount.

It should be noted that the frictional force at 60 must be greater than the frictional force between cam disc 44 and rear face 27. Otherwise, rotation of shaft 50 would only cause valve member 34 to rotate.

It will be apparent to those skilled in the art that many changes may be made in the details of construction and arrangement of parts without departing from the scope of the invention as defined in the appended claims.

I claim:

1. A fluid flow valve comprising in combination a gas cock having an inlet and an outlet for fluid fuel, a valve body between said inlet and said outlet for controlling the flow therebetween, said valve body having a front face and a rear face, an inlet port in said front face in communication with said inlet, a passage in said valve body providing communication between said faces, a rotary valve member in engagement with said front face, means for rotating said rotary valve member relative to said valve body, an arcuate groove formed in said rotary valve member, a rotary metering cam in engagement with said rear face for varying the effective area of said passage and a shaft interconnecting said rotary valve member and said metering cam for turning said metering cam with said rotary valve member, said rotary valve member being rotatable through a relatively wide angle with respect to said valve body in which said arcuate groove connects one end of said passage with said inlet port to provide unrestricted flow from said inlet port to said passage and to an extreme position in which said passage is closed from said inlet port, said metering cam cooperating with the other end of said passage to vary the effective area of said other end and thereby the flow rate to said outlet in response to the angular position of said rotary valve member with respect to said valve body.

2. A fluid flow valve comprising in combination a gas cock having an inlet and an outlet for fluid fuel, a valve body between said inlet and said outlet for controlling the flow threebetween, said valve body having a front face and a rear face, an inlet port in said front face in communication with said inlet, a passage in said valve body providing communication between said faces, a rotary valve member in engagement with said front face, means for rotating said rotary valve member relative to said valve body, an arcuate groove in said rotary valve member providing unrestricted communication between said inlet port and one end of said passage during rotation of said rotary valve member, a rotary metering cam in engagement with said rear face, a shaft interconnecting said rotary valve member and said metering cam, one end of said shaft being in threaded engagement with said rotary valve member, the other end of said shaft being keyed to said metering cam to normally rotate said metering cam with said rotary valve member to vary the effective area of the other end of said passage in response to the angular position of said rotary valve member relative to said valve body, said shaft being selectively rotatable independently of said rotary valve member for varying the angular position of said metering cam relative to said rotary valve member.

3. A fluid flow valve comprising in combination a gas cock having an inlet and an outlet for fluid fuel, a valve body between said inlet and said outlet for controlling the flow therebetween, said valve body having a front face and a rear face, an inlet port in said front face in communication with said inlet, a passage in said valve body providing communication between said faces, a rotary valve member in engagement with said front face, means for rotating said rotary valve member relative to said valve body, an arcuate groove in said rotary valve member normally registering with said inlet port and one end of said passage, a metering cam in engagement with said rear face, a shaft interconnecting said rotary valve member and said metering cam, one end of said shaft being in threaded engagement with said rotary valve member, the other end of said shaft being non-circular in cross-section, a non-circular aperture in said metering cam receiving said non-circular end of said shaft, whereby said metering cam normally rotates with said rotary valve member, said arcuate groove having a length such that unrestricted flow is provided from said inlet port through said arcuate groove to one end of said passage through a relatively wide angle of rotation of said rotary valve member, said metering cam cooperating with the other end of said passage to vary the effective area thereof and thereby the flow rate to said outlet in response to the angular position of said rotary valve member, said rotary valve member being rotatable to an extreme position in which said arcuate groove is out of registry with said inlet port thereby preventing flow between said inlet and said outlet, said shaft being selectively rotatable independently of said rotary valve member for varying the angular position of said metering cam relative to said rotary valve member.

References Cited in the file of this patent

UNITED STATES PATENTS

| 1,911,044 | Thrasher | May 23, 1933 |
| 2,561,531 | Mueller | July 25, 1951 |
| 2,634,949 | Robinson | Apr. 14, 1953 |
| 2,860,661 | Boegel | Nov. 18, 1958 |
| 2,912,005 | Fry | Nov. 10, 1959 |

FOREIGN PATENTS

| 472,690 | France | of 1914 |
| 475,173 | Italy | of 1951 |
| 625,411 | Germany | Feb. 10, 1936 |
| 673,319 | Great Britain | June 4, 1952 |